US008316763B2

(12) United States Patent
Houser et al.

(10) Patent No.: US 8,316,763 B2
(45) Date of Patent: Nov. 27, 2012

(54) DISABLING DEVICE FOR A PRESSING TOOL

(75) Inventors: Matthew Steven Houser, Jonestown, PA (US); Donald William Wright, Middletown, PA (US); David Michael Stull, Etters, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 537 days.

(21) Appl. No.: 12/477,417

(22) Filed: Jun. 3, 2009

(65) Prior Publication Data

US 2010/0307351 A1 Dec. 9, 2010

(51) Int. Cl.
*B30B 15/00* (2006.01)
*F16P 3/00* (2006.01)

(52) U.S. Cl. ........................................ 100/347; 100/219

(58) Field of Classification Search .................. 100/341, 100/342, 347, 219
See application file for complete search history.

(56) References Cited

U.S. PATENT DOCUMENTS

| | | | | | |
|---|---|---|---|---|---|
| 3,197,840 | A | * | 8/1965 | Van Hecke | 29/34 D |
| 3,851,371 | A | | 12/1974 | Plunkett | |
| 4,587,732 | A | | 5/1986 | Lind et al. | |
| 5,996,503 | A | * | 12/1999 | Woodall et al. | 102/498 |
| 2004/0031839 | A1 | | 2/2004 | Pruyne | |
| 2005/0132771 | A1 | | 6/2005 | Lefavour et al. | |

FOREIGN PATENT DOCUMENTS

| | | |
|---|---|---|
| EP | 1 032 093 | 8/2000 |
| EP | 1 270 959 | 1/2003 |
| GB | 884 526 A | 12/1961 |

OTHER PUBLICATIONS

International Search Report, International Application No. PCT/2010/001594, International Filing Date Jan. 6, 2010.

* cited by examiner

*Primary Examiner* — Jimmy T Nguyen

(57) ABSTRACT

A pressing tool includes a tool body having a working end, an actuator held by the tool body and operated during a pressing operation, and a disabling device operable to stop the hydraulic actuator during the pressing operation, wherein the actuator is disabled and locked in a disabled position after the disabling device is operated. Optionally, the disabling device may be configured to be reset to a normal operation position by a key.

16 Claims, 10 Drawing Sheets

DISABLING DEVICE FOR A PRESSING TOOL

BACKGROUND OF THE INVENTION

The subject matter herein relates generally to pressing tools, and more particularly to disabling devices for pressing tools.

Pressing tools are known and in use for a wide range of applications that press, form, crimp, cut or otherwise manipulate one or more components. For example, one particular application that uses pressing tools is a crimping application in which a terminal is crimped to an end of a wire. Some known pressing tools are hydraulically actuated to drive one or more parts of the tool toward one another during a pressing operation. Hydraulic pressing tools include a hydraulic pump that pumps hydraulic fluid to drive a piston or actuator through a pressing stroke. Such hydraulic pressing tools are typically equipped with a fluid dump button that may be pressed by the operator during any portion or the pressing stroke to release the pressure of the tool. For example, if the components, such as the terminal and/or the wire, are improperly positioned within the tool, the operator may stop the pressing operation to readjust the position of the components or to discard the components altogether. Additionally, if the tool is in danger of pressing components that should not be pressed by the tool, the operator may stop the pressing operation and retract the tooling by dumping the hydraulic fluid. If the operator's fingers are in the crimp zone between the moving components of the tool, the operator may stop the pressing operation and retract the tooling. Other reasons may exist for which the operator may desire to stop the pressing operation and retract the tooling.

In the example of the crimping application, the terminal may be only partially crimped to the wire when the fluid dump button is activated by the operator. Additionally, it is possible that the fluid dump button be inadvertently pressed by the operator, releasing the pressure of the tool. When the pressing tool does not complete the pressing stroke, a partial crimp may result. The operator may be unaware that a partial crimp has occurred. An improper or inadequate mechanical and/or electrical connection may result from a partial crimp. If such terminals are eventually used in a piece of equipment or other electrical system, the equipment and/or system may ultimately fail as a result of the inadequate mechanical or electrical connection between the partially crimp terminal and wire. In some industries, such failure is unacceptable and potentially fatal. For example, in the aerospace industry, if part of a system within an airplane were to fail, a crash may result. As such, certain industries have high quality control standards. Certain industries or production facilities have regulations that require a partially crimp terminal to be discarded. As a result, whenever the fluid dump button of a pressing tool is activated, the terminal being crimped is required to be discarded. Some industries or production facilities may require that a supervisor verify that the terminal has been discarded.

A need remains for a pressing device having a disabling device that also provides indication that the device has been activated. A need remains for a pressing device having high quality control features.

BRIEF DESCRIPTION OF THE INVENTION

In one embodiment, a pressing tool is provided that includes a tool body having a working end, an actuator held by the tool body and operated during a pressing operation, and a disabling device operable to stop the hydraulic actuator during the pressing operation, wherein the actuator is disabled and locked in a disabled position after the disabling device is operated. Optionally, the disabling device may be configured to be reset to a normal operation position by a key.

In another embodiment, a hydraulic pressing tool is provided that includes a tool body having a working end, a hydraulic actuator held by the tool body and operated during a pressing operation and having a fluid dump, and a disabling device operable to release the pressure of the hydraulic actuator during the pressing operation. The disabling device has a housing coupled to the tool body and a ram received within the housing. The disabling device has a trigger engaging the ram that is operated to actuate the ram to a disabled position in which the ram engages the fluid dump to release the pressure of the hydraulic actuator, dump the hydraulic fluid to the reservoir, and retract the tooling. The ram is locked in the disabled position such that the trigger is blocked from returning to a normal operation position by the ram.

Optionally, the trigger may be entirely removed from the housing and the ram may be actuated to the disabled position when the trigger is removed from the housing. The housing may include a key way configured to receive a key therethrough for engaging the ram and for returning the ram to a normal operation position. The trigger may be reset after the ram is, returned to the normal operation position. The housing may include an end having a key way therethrough. The ram may be forced in a release direction generally away from the end by a bias spring. The ram may have a key slot generally aligned with the key way, wherein the key way is configured to receive a key therethrough in a direction along the release direction. The key slot may be configured to matably receive the key to return the ram to the normal position.

Optionally, the trigger may constitute a pull pin operated by pulling the pull pin from the housing. The trigger may extend through a trigger bore in the housing and a trigger bore in the ram when the trigger is in the normal position. The trigger bore in the ram may be misaligned with the trigger bore in the housing after the trigger is operated to actuate the ram. A wall of the ram may be aligned with the trigger bore in the housing when the ram is in the disabled position such that the trigger cannot be loaded into the trigger bore in the ram.

In a further embodiment, a hydraulic pressing tool is provided that includes a tool body having a working end, a hydraulic actuator held by the tool body and operated during a pressing operation and having a fluid dump, and a disabling device operable to release the pressure of the hydraulic actuator during the pressing operation. The disabling device has a ram operably coupled to the fluid dump, the disabling device having a trigger engaging the ram, the trigger being operated to actuate the ram to a disabled position in which the ram operates the fluid dump to release the pressure of the hydraulic actuator, the disabling device having a spring loaded pin movable to a blocking position when the trigger is operated to block the trigger from returning to a normal operation position.

Optionally, the pin may extend along a pin axis, the pin being movable in a direction parallel to the pin axis, the pin having a tapered section along at least a portion thereof such that the pin is non-cylindrical along a length thereof. The pin may have a front end and a rear end, where the rear end is moved toward the front end as the pin is moved to the blocking position. The tapered section may be positioned proximate to the rear end such that the tapered section is aligned with the trigger when the pin is in the blocking position. The trigger may be moved generally perpendicular to the pin axis when the trigger is operated to actuate the ram. The tapered section may be aligned with the trigger when the pin is moved to the blocking position such that the trigger is held further from the pin axis when the pin is in the blocking position. The trigger may be pivoted from the normal operation position to an actuated position. The tapered section may extend between a first end and a second end, where the first end has a first diameter, and the second end has a second diameter larger than the first diameter. The trigger may initially engage the first end such that the tapered section is non-aligned with the trigger, and the tapered section may be aligned with the trigger when in the blocking position. Optionally, a spring actuated cam may be moved to an actuated position that blocks rearward movement of the pin from the blocking position. The cam may move to the actuated position simultaneously as the pin is moved to the blocking position.

Optionally, a cover may be coupled to the tool body restricting access to the pin. The cover may be removable to provide access to the pin to move the pin from the blocking position to allow the trigger to be reset. At least a portion of the cover may be transparent or open such that the pin is visible when in the blocking position. The cover may be removable by a key.

DETAILED DESCRIPTION OF THE INVENTION

Figure 1:
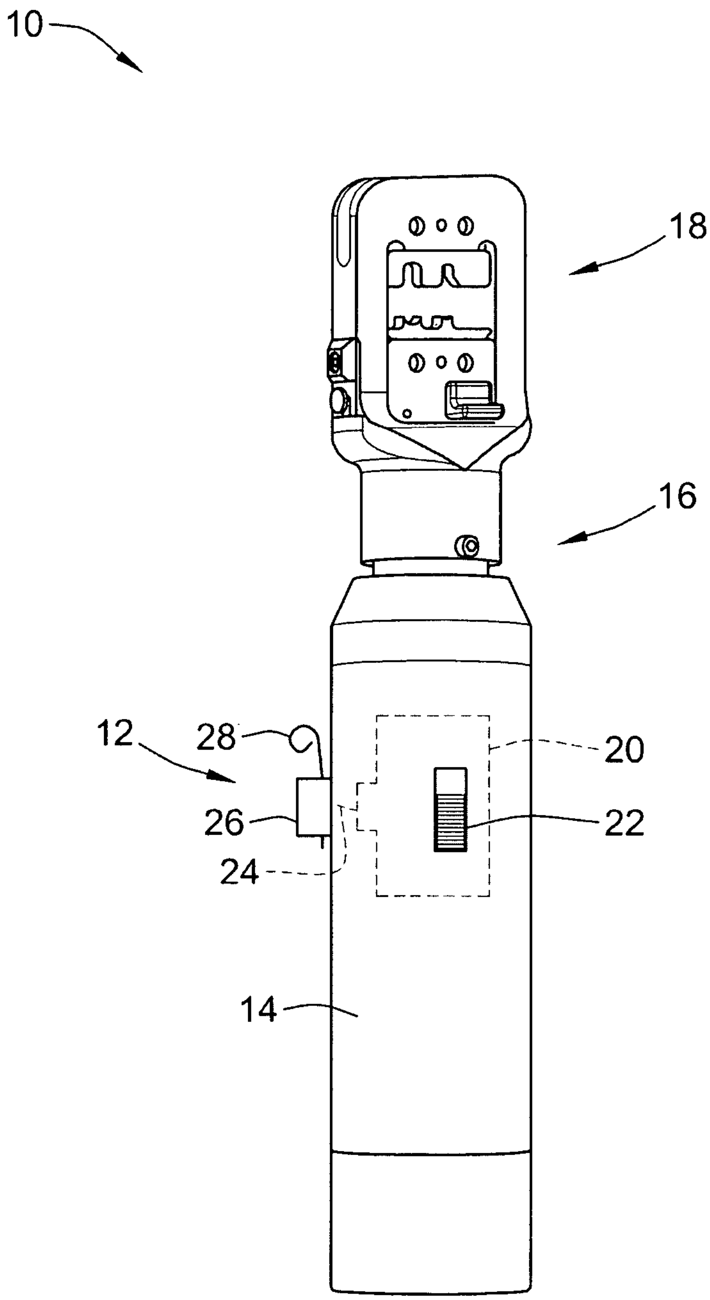
FIG. 1 illustrates an exemplary pressing tool having a disabling device formed in accordance with an exemplary embodiment.

FIG. 1 illustrates a pressing tool 10 having a disabling device 12 formed in accordance with an exemplary embodiment. The pressing tool 10 includes a tool body 14 having a working end 16. Tooling 18 is provided at the working end 16. The tooling 18 is configured to be driven by an actuator 20 during a pressing operation. The actuator 20 is held by the tool body 14 and is operated by an activation switch 22.

In the illustrated embodiment, the tooling 18 is represented by crimp tooling used to crimp a terminal (not shown) to a wire (not shown). The subject matter herein is not intended to be limited to crimp tooling. In the illustrated embodiment, the actuator 20 is represented by a hydraulic actuator, such as a hydraulic pump, that drives a piston which is used to drive the tooling 18 during the pressing operation. The subject matter herein is not intended to be limited to a hydraulic actuator that is hydraulically driven, but rather may be driven mechanically, electrically, pneumatically, and the like. Such devices may include disabling features that stop the operation and/or reverse the operation of the devices. For example, devices that are mechanically driven may include a stop feature that blocks further actuation of the device. Electrically driven devices may stop and/or reverse the direction of the electrically driven component. For example, a motor within the device may be disabled or reversed. Pneumatically driven devices may include an air release. In the illustrated embodiment, the pressing tool 10 is a hand-held tool sized and adapted for being held by an operator, however the pressing tool 10 may be a bench machine or another type of tool.

The disabling device 12 is held by the tool body 14. The disabling device 12 is operable to release the pressure of the actuator 20 during the pressing operation. For example, with a hydraulic pressing tool, the disabling device 12 may be activated to operate a fluid dump 24 associated with the actuator 20. The fluid dump 24 is a device, switch or component that releases the pressure of the actuator 20, such as by allowing hydraulic fluid to return to the hydraulic fluid reservoir. When the disabling device 12 is operated, the hydraulic pressure is released to stop the pressing operation and/or to retract the tooling 18.

The disabling device 12 includes a housing 26 and a trigger 28. The trigger 28 is actuated to operate the fluid dump 24. In the illustrated embodiment, the trigger 28 is represented by a pull pin, and may be referred to hereinafter as pull pin 28. The disabling device 12 is operated by removing the pull pin 28 from the housing 26.

Figure 2:
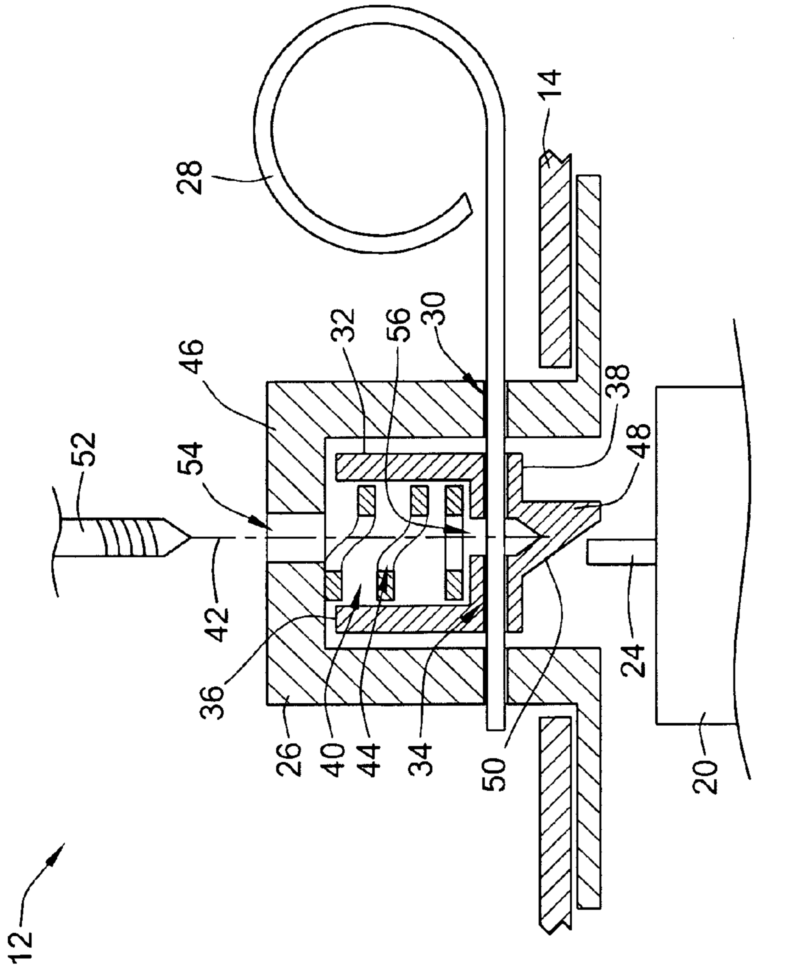
FIG. 2 is a cross-sectional view of the disabling device shown in FIG. 1.
Figure 3:
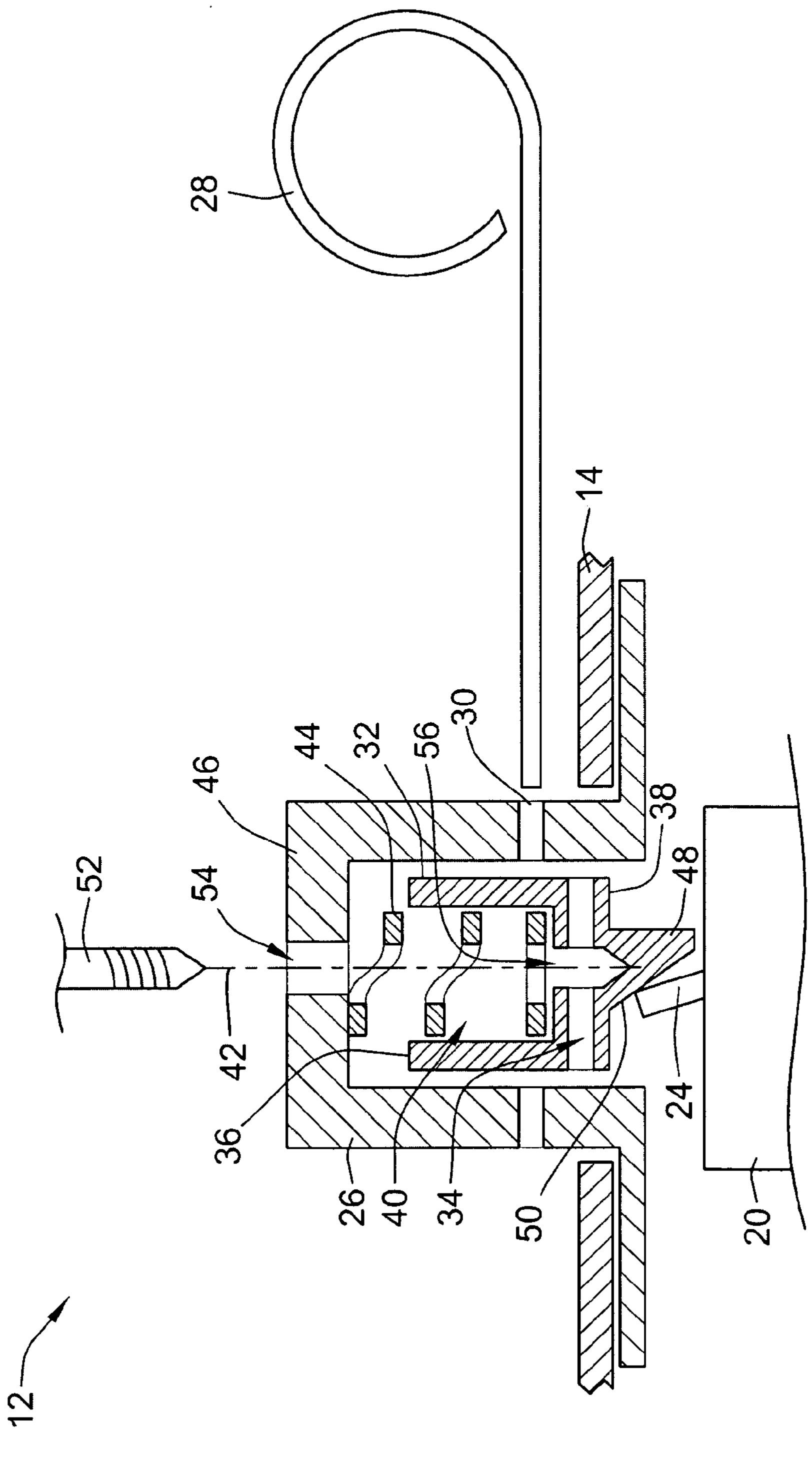
FIG. 3 as a cross-sectional view of the disabling device shown in FIG. 1 illustrating the disabling device in a released position.

FIG. 2 is a cross-sectional view of the disabling device 12 in a normal operation position. FIG. 3 as a cross-sectional view of the disabling device 12 in a released position. In the normal operation position, the pressing tool 10 (shown in FIG. 1) may be operated normally and the tooling 18 (shown FIG. 1) may be moved in the pressing operation. In the normal operation position, the trigger 28 is coupled to the housing 26. For example, the trigger 28 is received in a trigger bore 30 that extends generally along the tool body 14 (shown in FIG. 1). In the released position, the actuator 20 is disabled, thus releasing the pressure driving tooling 18 during the pressing operation.

The disabling device 12 includes a ram 32 received within the housing 26. The trigger 28 engages the ram 32 in the normal operation position. For example, the trigger 28 is received in a trigger bore 34 that extends through the ram 32. The trigger bore 34 is aligned with the trigger bore 30. The ram 32 includes an open top 36 and a closed bottom 38. The ram 32 includes a cavity 40 therein that extends along a longitudinal axis 42 of the ram 32. The ram 32 is movable along the longitudinal axis 42 between the normal operation position, which is shown in FIG. 2, and a disabled position, which is shown in FIG. 3.

In an exemplary embodiment, a bias spring 44 is received within the cavity 40 and is biased against the bottom 38. The bias spring 44 is also biased against an outer end 46 of the housing 26. During operation, when the trigger 28 is removed from the housing 26, the bias spring 44 forces the ram 32 inward in a direction away from the outer end 46 to the disabled position. In the disabled position, the trigger bore 34 is non-aligned with the trigger bore 30. The trigger 28 is not capable of being coupled to the housing 26 when the trigger bores 30, 34 are offset. The trigger 28 can only be coupled to the housing 26 when the ram 32 is reset from the disabled position to the normal operation position.

The bottom 38 includes a ramp feature 48 extending therefrom. The ramp feature 48 is configured to engage the fluid dump 24 to disable the actuator 20. In an exemplary embodiment, the finger 48 includes a ramp surface 50 angled across the fluid dump 24. When the ram 32 is moved to the disabled position, the ramp surface 50 engages the fluid dump 24 and actuates the fluid dump 24 to disable the actuator 20. For example, the fluid dump 24 is forced from a generally vertical position, which extends parallel to the longitudinal axis 42 in the normal operation position, to a tilted position, in which the fluid dump 24 is angled transverse to the longitudinal axis 42.

In operation, the ram 32 is reset from the disabled position to the normal operation position by moving the ram 32 generally towards the outer end 46 of the housing 26. In an exemplary embodiment, a special key 52 is used to pull the ram 32 to the normal operating position. The housing 26 includes a key way 54 extending through the outer end 46 that receives the key 52. The key 52 extends through the center of the bias spring 44 and engages the bottom 38 of the ram 32. In an exemplary embodiment, a key slot 56 is formed in the bottom 38 that receives the key 52. For example, the key slot 56 may be threaded and the key 52 may have a corresponding thread to securely couple the key 52 to the key slot 56. Optionally, the key 52 may be a special, non-conventional tool such that the disabling device 12 is tamperproof. As such, the ram 32 cannot be returned to the normal operation position without the required special key 52. In an exemplary embodiment, the threading of the key slot 56 may have an odd pitch that resists mating with a threaded tool that does not have a complementary pitched key. Optionally, the threading of the key slot 56 may have a left-handed thread. Once the key 52 is securely coupled to the key slot 56 the key 52 may be lifted away from the tool body 14 to lift the ram 32 until the trigger bores 30, 34 are aligned. Once the trigger bores 30, 34 are aligned, the trigger 28 may be loaded into the trigger bore 30, 34 to hold the ram 32 in the normal operation position within the housing 26. When the ram 32 is in the normal operation position, the fluid dump 24 may be returned to the normal operation position and the actuator 20 may be operated normally.

During operation, after the disabling device 12 is used to release the pressure, the pressing tool 10 cannot be used normally. The ram 32 needs to be reset in order for the fluid dump 24 to return to a normal operation position and allow the actuator 20 to operate normally. Removal of the trigger 28 functions as a visual indication to the operator and to others that the disabling device 12 has been activated. In an exemplary embodiment, for quality control reasons or other reasons, the operator may not be able to replace the trigger 28. For example, the operator may not be given the key 52. Rather, the operator must take the pressing tool 10 to a supervisor or another individual to reset the disabling device 12 using the key 52. The supervisor or other individual can then verify that the terminal and wire that were being crimped when the disabling device 12 was activated are properly discarded.

Figure 4:
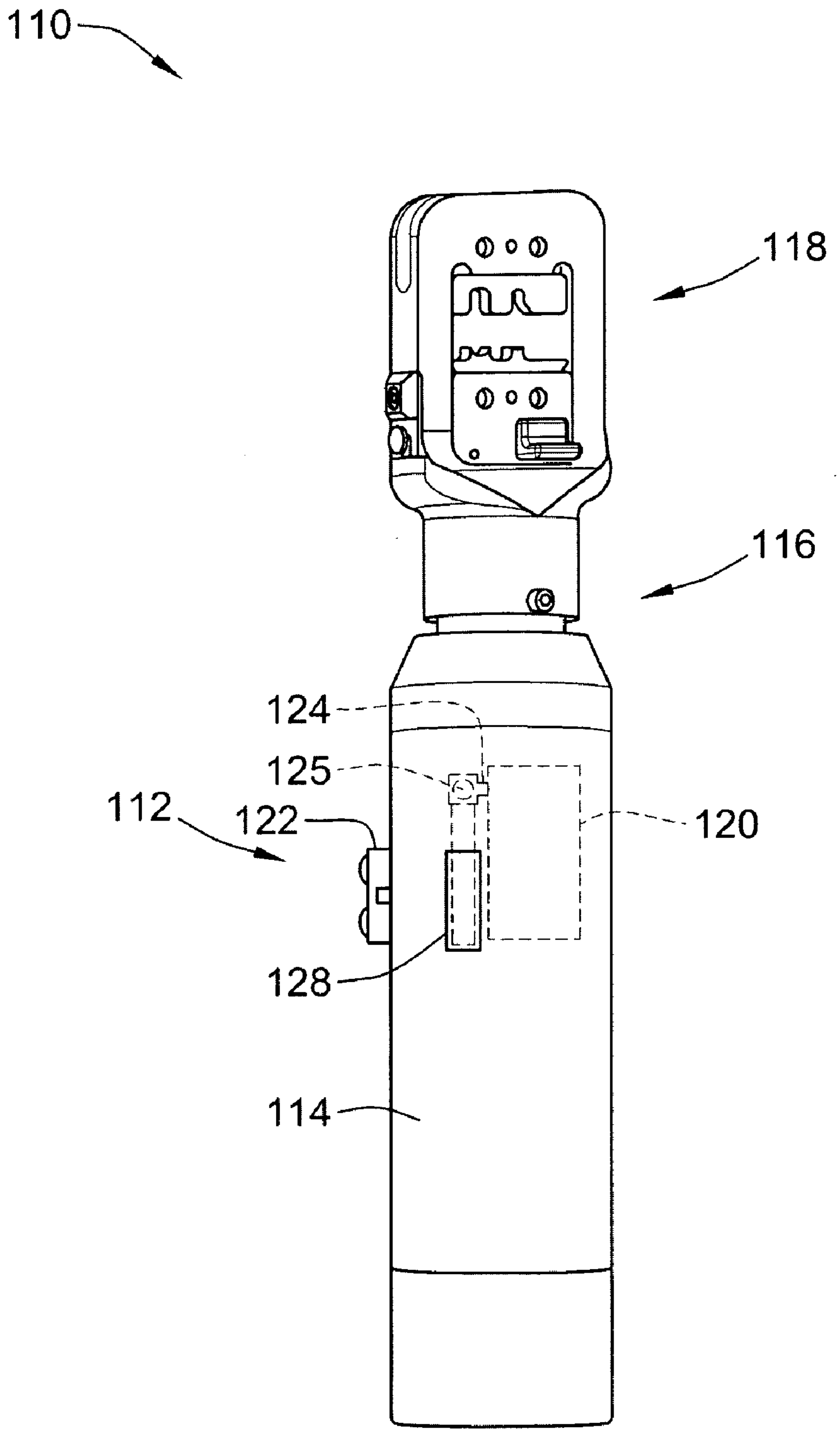
FIG. 4 illustrates a pressing tool with an alternative disabling device.

FIG. 4 illustrates a pressing tool 110 with an alternative disabling device 112. The pressing tool 110 includes a tool body 114 having a working end 116. Tooling 118 is provided at the working end 116. The tooling 118 is configured to be driven by an actuator 120 during a pressing operation. The actuator 120 is held by the tool body 114 and is operated by an activation switch (not shown).

In an exemplary embodiment, a cover 122 is coupled to the tool body 114. As described in further detail below, the cover 122 may be transparent, translucent, or have an opening that allows the operator to view a portion of the disabling device 112 to provide a visual indication of activation of the disabling device 112.

The disabling device 112 is held by the tool body 114. The disabling device 112 is operable to release the pressure of the actuator 120 during the pressing operation. For example, the disabling device 112 may be activated to operate a fluid dump 124 associated with the actuator 120. When the disabling device 112 is operated, the hydraulic pressure is released to stop the pressing operation and/or to retract the tooling 118.

The disabling device 112 includes a ram 126 that is actuated to operate the fluid dump 124. The disabling device 112 also includes a trigger 128 operatively coupled to the ram 126 that moves the ram 126 when the trigger 128 is operated. In the illustrated embodiment, the trigger 128 is represented by a lever or button that is pushed into the tool body 114, and may be referred to hereinafter as lever 128. The ram 126 is represented by a pin having a spool at the end thereof that is engaged to the end of the lever 128. The disabling device 112 is operated by pressing down on the lever 128, which lifts the ram 126 outward to activate the fluid dump 124 and thus release the pressure of the actuator 120. The disabling device 112 may include a housing that is held by the tool body 114 and that holds the various components of the disabling device 112.

The disabling device 112 may be operated differently in alternative embodiments. For example, the trigger 128 may be lifted up as opposed to being pressed down. The trigger 128 may be slid in one direction or another to actuate the disabling device 112. Other types of triggers may be used in other embodiments to actuate the disabling device 112. Additionally, the ram 126 may be actuated in different manners other than being pulled outward, as in the illustrated embodiment, depending on the particular configuration of the fluid dump 124, the ram 126 and the trigger 128.

Figure 5:
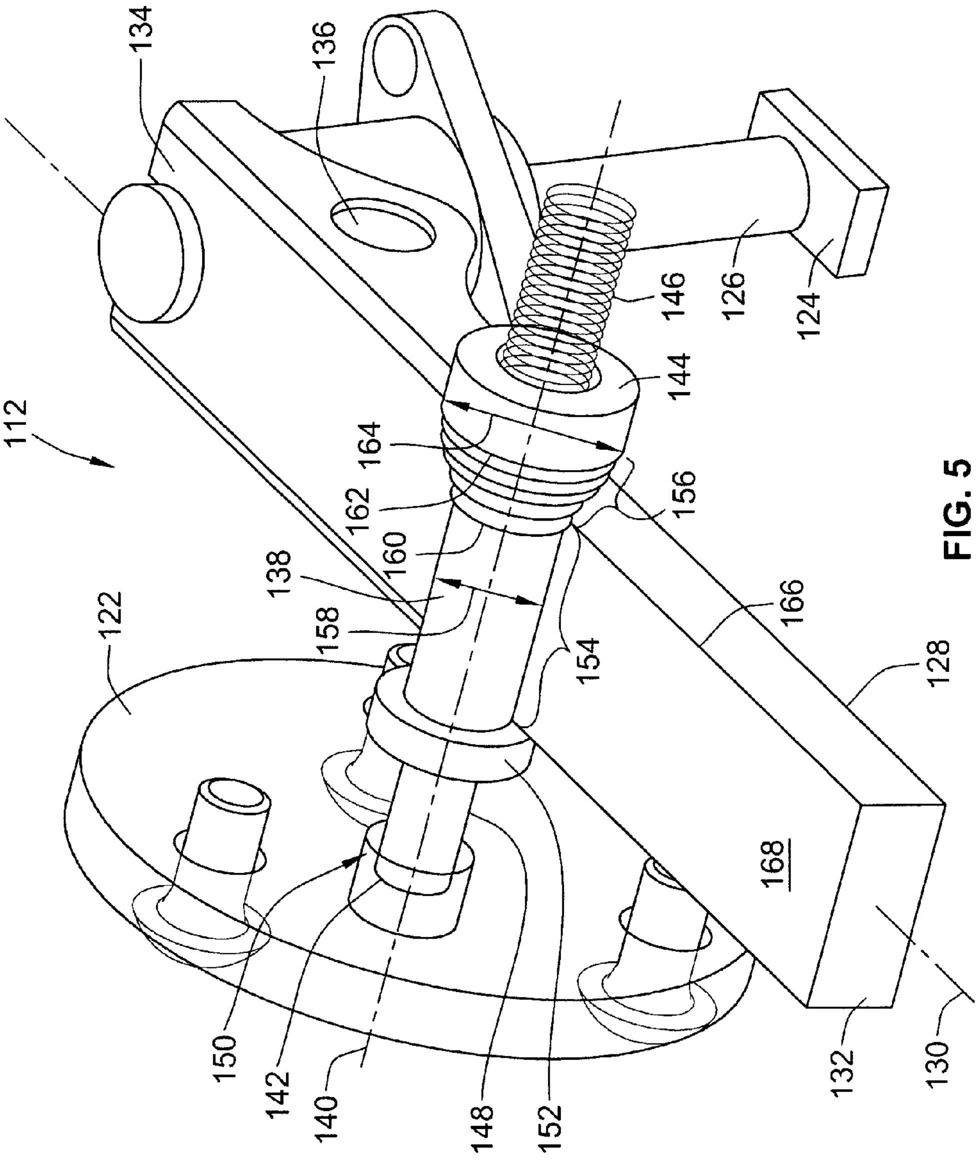
FIG. 5 illustrates a perspective view of the disabling device shown in FIG. 4 with a tool body of the pressing tool removed.

FIG. 5 illustrates a portion of the pressing tool 110 with the tool body 114 (shown in FIG. 1) and at least some of the internal components of the pressing tool removed for clarity. FIG. 5 illustrates some of the components of the disabling device 112. The trigger 128 extends along a longitudinal axis 130 between a first end 132 and a second end 134. The trigger 128 has a fulcrum 136 and the trigger 128 is movable between a normal operation position, such as the position illustrated in FIG. 5, and an actuated position. In the illustrated embodiment, the fulcrum 136 is positioned closer to the second end 134. The second end 134 engages the ram 126. The first end 132 is configured to be actuated by an operator by pressing on the first end 132, thus pivoting the trigger 128 about the fulcrum 136 to move the second end 134. As the second end 134 moves outward, the ram 126 is simultaneously moved to a disabled position, in which the ram 126 operates the fluid dump 124 to release the pressure of the actuator 120 (shown in FIG. 4). When the trigger 128 is in the actuated position, the ram 126 is in the disabled position. When the trigger 128 is in the normal operation position, the ram 126 is also in a normal operation position and the pressing tool 110 may be operated normally.

The disabling device 112 includes a spring-loaded pin 138 movable upon actuation of the trigger 128. The pin 138 is moved from a normal operation position, such as the positioned illustrated than FIG. 5, to a blocking position in which the pin 138 blocks the trigger 128 in the actuated position and restricts the trigger 128 from returning to a normal operation position. When the trigger 128 is in the normal operation position, the actuator 120 may be operated normally. When the trigger 128 is in the actuated position, the pressure of the actuator 120 is released and the pressing too 1110 cannot be operated.

The pin 138 extends along a pin axis 140 between a front end 142 and a rear end 144. A bias spring 146 engages the pin 138 at the rear end 144. The bias spring 146 extends generally along the pin axis 140 and forces the pin 138 to move in a direction parallel to and along the pin axis 140. The pin 138 is held in the normal operation position by the trigger 128. However, when the trigger 128 is actuated to the actuated position, the pin 138 is released and forced to the blocking position by the bias spring 146. The pin 138 may be reset to the normal operation position to allow the trigger 128 to return to the normal operation position.

The pin 138 includes a visual indication section 148 at the front end 142 that is positioned proximate to the cover 122. In an exemplary embodiment, the visual indication section 148 is received in a hole 150 in the cover 122. The hole 150 is closed at the outer end thereof which restricts access to the pin 138 from outside of the pressing tool 110. When the pin 138 is released to the blocking position, the visual indication section 148 is moved outward within the hole 150 such that a significant portion of the visual indication section 148 may be visible through the cover 122. For example, the cover 122 may be transparent and the pin 138 may be colored or otherwise visually evident such that the pin 138 can be seen through at least a portion of the cover 122.

The pin 138 includes a flange 152 inward or rearward of the visual indication section 148. The flange 152 operates as a travel limit for the pin 138 as the pin 138 is moved from the normal operation position to the blocking position. For example, the flange 152 may engage the cover 122 or a portion of the tool body 114 to restrict movement of the pin 138 in an outward direction along the pin axis 140. Optionally, the flange 152 may also operate as a travel limit for the pin 138 as the pin 138 is moved from the blocking position back to the normal operation position. For example, the flange 152 may engage the trigger 128 or a portion of the tool body 114 to restrict movement of the pin 138 in an inward direction along the pin axis 140.

The pin 138 includes a main body 154 and a tapered section 156 rearward of the main body 154. The main body 154 is positioned inward or rearward of the flange 152. The main body 154 rests upon the trigger 128 in the normal operation position. The main body 154 has a first diameter 158. The tapered section 156 extends between a first end 160 and a second end 162. The diameter of the pin 138 along the tapered section 156 gradually increases between the first end 160 and the second end 162. The diameter of the tapered section 156 at the first end 160 is substantially the same as the first diameter 158. The tapered section 156 has a second diameter 164 at the second end 162. The second diameter 164 is greater than the first diameter 158. Optionally, the tapered section 156 may be stepped and have a series of rings of sequentially greater diameter. Alternatively, the tapered section 156 may have a continuous, sloped or angled surface between the first and second ends 160, 162. Optionally, the tapered section 156 may have a single large step such that the tapered section 156 has a flat, radially extending surface. The diameter of the pin 138 may be equal to the second diameter 164 between the second end 162 and the rear end 144 of the pin 138. Alternatively, the diameter of the pin 138 may be gradually or sharply decreased rearward of the second end 162 such that the pin 138 as a diameter at the rear end 144 that is smaller than the second diameter 164. For example, the diameter at the rear end 144 may be approximately equal to the first diameter 158.

In an exemplary embodiment, the pin 138 is held in the normal operation position by the trigger 128. For example, the first end 160 of the tapered section 156 may abut against an edge 166 of the trigger 128. The tapered configuration of the tapered section 156 creates an interference with the trigger 128 which overcomes the bias force of the bias spring 146. However, when the trigger 128 is actuated and pressed away from the pin 138, clearance is provided between the trigger 128 and the pin 138 to allow the pin 138 to move to the blocking position. In the blocking position, the second end 162 of the tapered section 156 is aligned with an outer surface 168 of the trigger 128. Because the pin 138 has a larger diameter at the second end 162, the trigger 128 is blocked from returning to the normal operation position. The trigger 128 is held in the actuated position until the pin 138 is reset and the main body 154 is again aligned with the outer surface 168.

Figure 6:
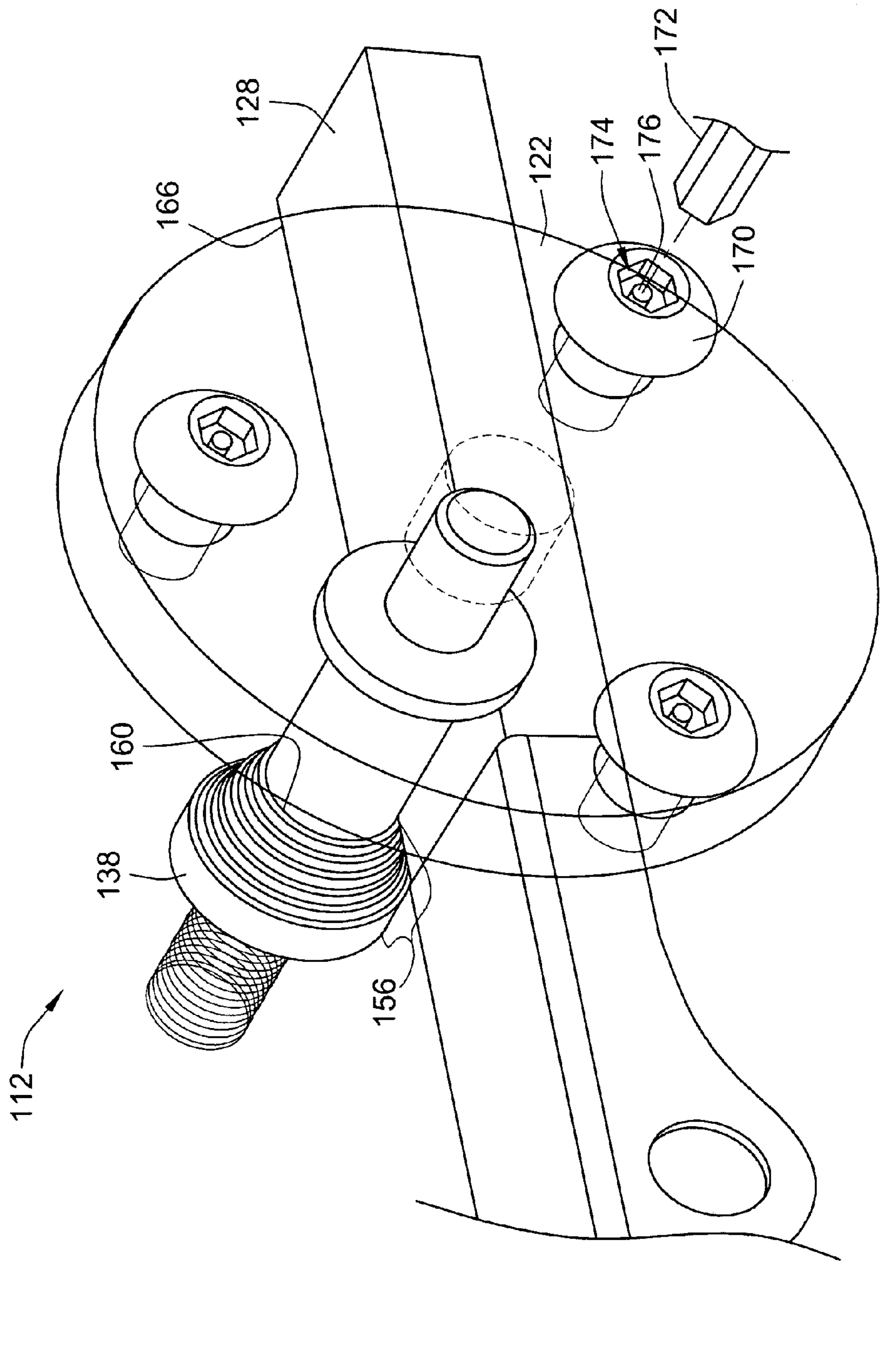
FIG. 6 is a partial perspective view of the disabling device shown in FIG. 5.

FIG. 6 is a partial perspective view of the disabling device 112. The pin 138 is held in the normal operation position by the trigger 128. For example, the edge 166 of the trigger 128 engages the first end 160 of the tapered section 156.

The cover 122 restricts access to the pin 138 such that, when the pin 138 is moved to the blocking position, the pin 138 cannot be accessed through the cover 122. In an exemplary embodiment, the cover 122 may be removed from the tool body 114 (shown in FIG. 4) to provide access to the pin 138 so that the pin 138 can be reset to the normal operation position and the trigger 128 may likewise be reset to the normal operation position.

In an exemplary embodiment, one or more fasteners 170 may be used to couple the cover 122 to the tool body 114. A key 172 is used to remove the fasteners 170. Optionally, the key 172 may be a special, non-conventional tool such that the disabling device 112 is tamperproof. As such, the pin 138 cannot be returned to the normal operation position without the required special key 172. In the illustrated embodiment, the fasteners 170 have a multisided opening 174 that receives the end of the key 172. The opening 174 may have six sides and be hexagonally shaped. A post 176 is provided within the opening 174 such that conventional hex key tools, such as an allen wrench, cannot be used to remove the fasteners 170. The key 172 must have an opening at the end to receive the post 174.

Figure 7:
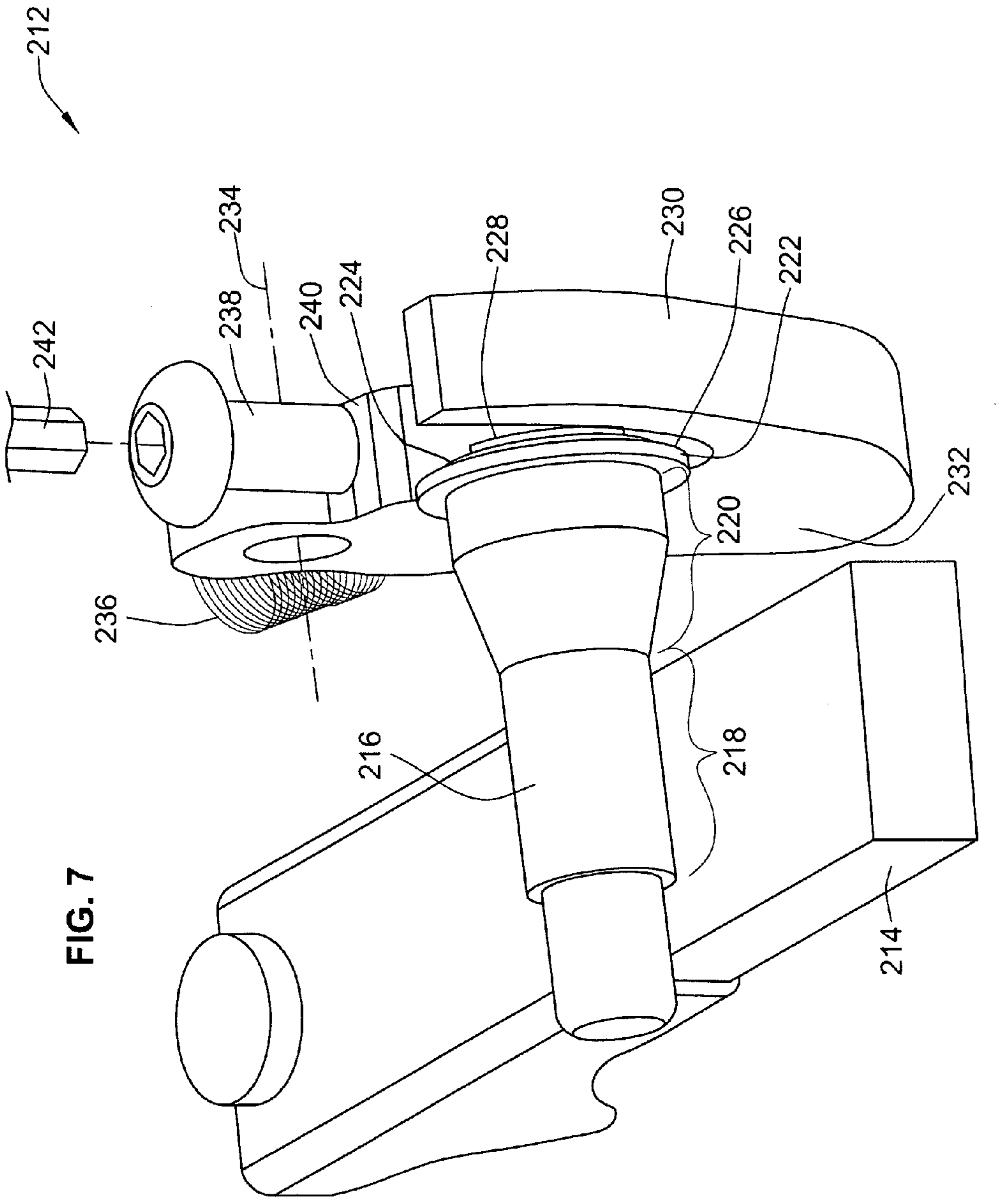
FIG. 7 is a perspective view of an alternative disabling device for the pressing tool shown in FIG. 4.
Figure 8:
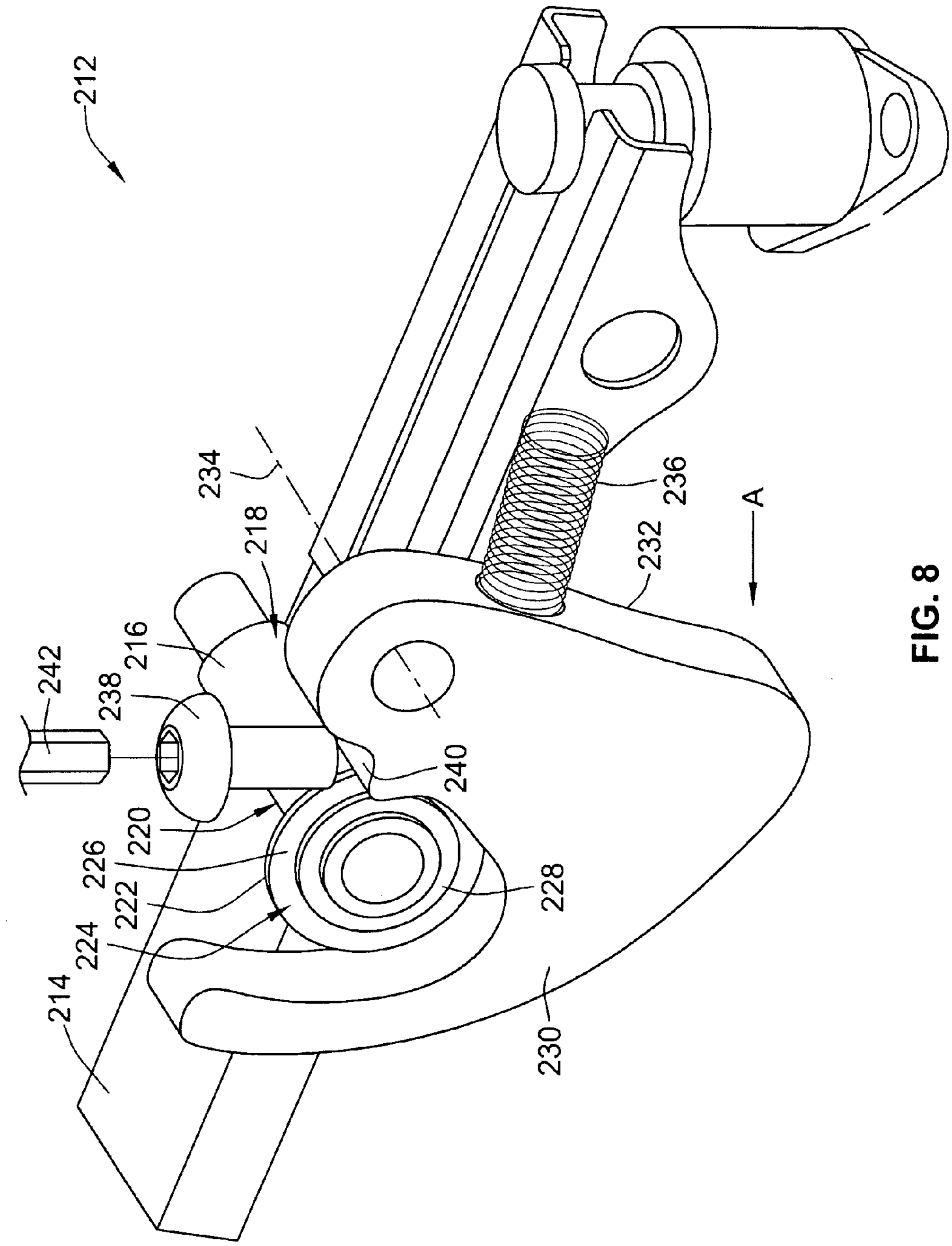
FIG. 8 is another perspective view of the disabling device shown in FIG. 7.

FIGS. 7 and 8 are front and rear perspective views, respectively, of an alternative disabling device 212 for the pressing tool 110 (shown in FIG. 4). The disabling device 212 is similar to the disabling device 112 (shown in FIG. 5) in some respects and may be operated in a similar manner. The disabling device 212 includes a trigger 214 and a spring-loaded pin 216 that is movable upon actuation of the trigger 214. The pin 216 is moved from a normal operation position, such as the position illustrated in FIG. 7, to a blocking position in which the pin 216 blocks the trigger 214 in an actuated position and restricts the trigger 214 from returning to a normal operation position.

The pin 216 includes a main body 218 and a tapered section 220 that extends rearward from the main body 218. The pin 216 includes a rear end flange 222 at the rear end of the pin 216. The rear end flange 222 has a rear facing tapered portion 224. The tapered portion 224 has a first end 226 and a second end 228 rearward of the first end 226. The first end 226 has a larger diameter than the second end 228. Optionally, the tapered portion 224 may be stepped and have a series of rings of sequentially greater diameter. Alternatively, the tapered portion 224 may have a continuous, sloped or angled surface. Optionally, the tapered portion 224 may have a single large step such that the tapered portion has a flat, radially extending surface.

In an exemplary embodiment, a spring-loaded cam 230 is provided rearward of the pin 216. The cam 230 is generally U-shaped, however the cam 230 may be shaped differently in alternative embodiments. The cam 230 includes an abutment surface 232 that engages the pin 216. The cam 230 is configured be rotated about a pivot axis 234, such as in the direction of arrow A. A bias spring 236 engages the cam 230 to rotate the cam 230 about the pivot axis 234. The cam 230 initially engages the pin 216 proximate to the first end 226. When the pin 216 is moved to the blocking position, such as when the trigger 214 is actuated, the cam 230 is allowed to rotate to a blocking position. In the blocking position, the second end 228 of the pin 216 engages the abutment surface 232 of the cam 230. The cam 230 blocks the pin 216 from moving rearward. As a result, the pin 216 cannot be reset to the normal operation position when the cam 230 is in the blocking position.

The cam 230 may be rotated to a non-blocking position to allow the pin 216 to be reset to the normal operation position. For example, a set screw 238 is positioned proximate to the cam 230. The set screw 238 may be adjusted to drive the cam 230 from the blocking position to the non-blocking position. For example, the set screw 238 may engage a shoulder 240 of the cam 230 as the set screw 238 is adjusted. Once the cam 230 is positioned in the non-blocking position, the pin 216 may be reset. The pin 216 may be reset by pushing the front end of the pin 216 rearwardly. Optionally, the pin 216 may only be accessed through a cover in a similar manner as the pin 138 (shown in FIG. 5).

A key 242 is used to adjust the set screw 238. Optionally, the key 242 may be a special, non-conventional tool such that the disabling device 212 is tamperproof. As such, the pin 216 cannot be returned to the normal operation position without the required special key 242. In the illustrated embodiment, the set screw 238 is similar to the fastener 170 (shown in FIG. 6). Other types of set screw is may be used in alternative embodiments.

Figure 9:
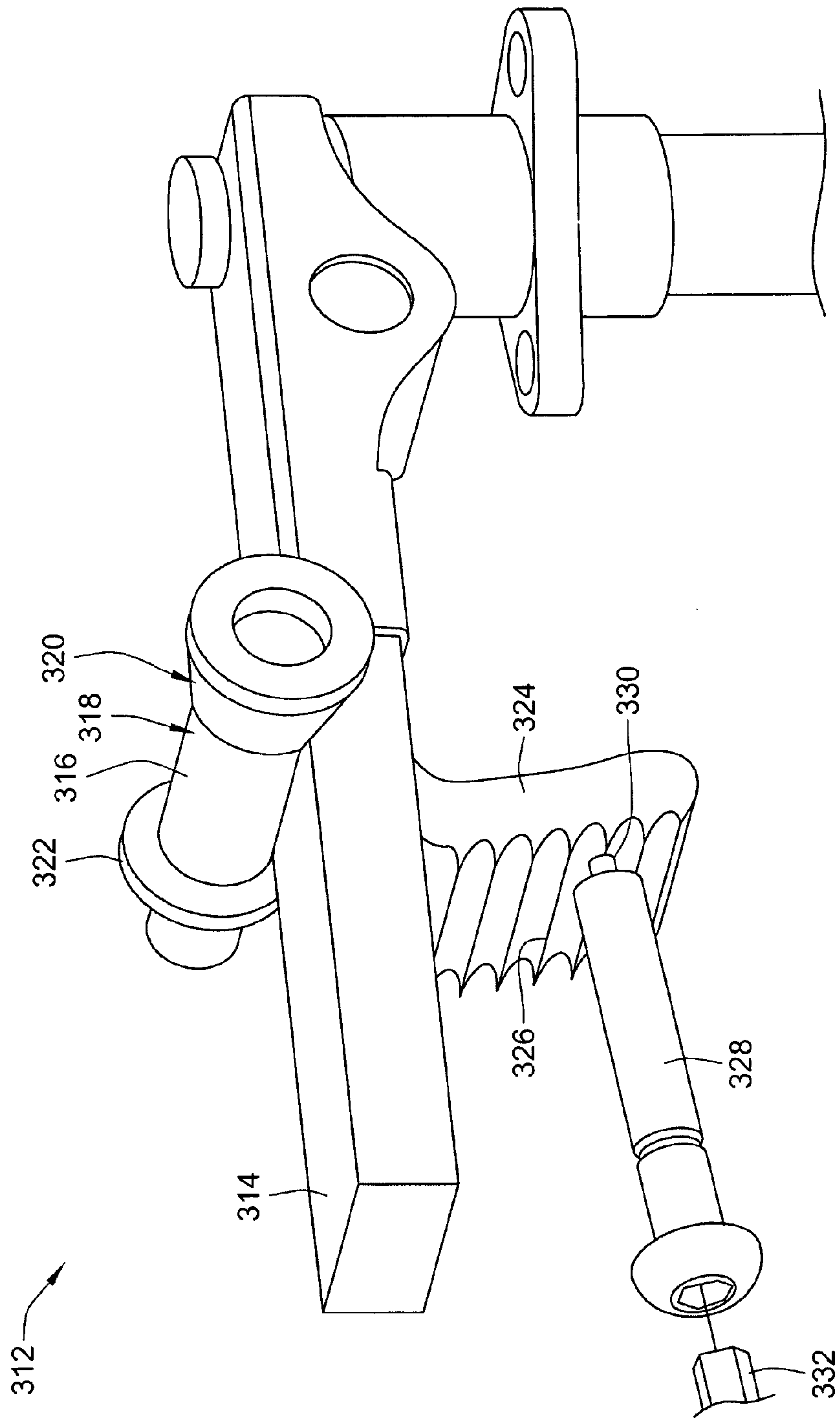
FIG. 9 is a perspective view of another alternative disabling device for the pressing tool shown in FIG. 4.

FIG. 9 is a perspective view of yet another alternative disabling device 312 for the pressing tool 110 (shown in FIG. 4). The disabling device 312 is similar to the disabling device 112 (shown in FIG. 5) in some respects and may be operated in a similar manner. The disabling device 312 includes a trigger 314 and a spring-loaded pin 316 that is movable upon actuation of the trigger 314.

The pin 316 includes a main body 318 and a tapered section 320 that extends rearward from the main body 318. The pin 316 includes a flange 322 proximate to the front end of the pin 316. The pin 316 is moved from a normal operation position, such as the positioned illustrated than FIG. 9, to a blocking position in which the pin 316 blocks the trigger 314 in an actuated position and restricts the trigger 314 from returning to a normal operation position. In the normal operation position, the main body 318 is aligned with the trigger 314. In the blocking position, the thick part of the tapered section 320 is aligned with the trigger 314 to hold the trigger 314 in an actuated position.

In an exemplary embodiment, the disabling device 312 includes a secondary blocking feature in addition to the pin 316 that holds the trigger 314 in the actuated position. A jaw 324 extends inward from the trigger 314. A plurality of teeth 326 are provided on the jaw 324. The disabling device 312 includes a catch pin 328 having a projection 330 that engages the teeth 326 to hold the trigger 314 in position relative to the catch pin 328. As the trigger 314 is pressed inward to the actuated position, the catch pin 328 engages different teeth 326 that are successively closer to the trigger 314. The trigger 314 is held in place by the catch pin 320.

A key 332 is used to adjust the catch pin 328. Optionally, the key 332 may be a special, non-conventional tool such that the disabling device 312 is tamperproof. As such, the pin 316 cannot be returned to the normal operation position without the required special key 332. In the illustrated embodiment, the catch pin 328 is similar to the fastener 170 (shown in FIG. 6). Other types of catch pins may be used in alternative embodiments.

Figure 10:
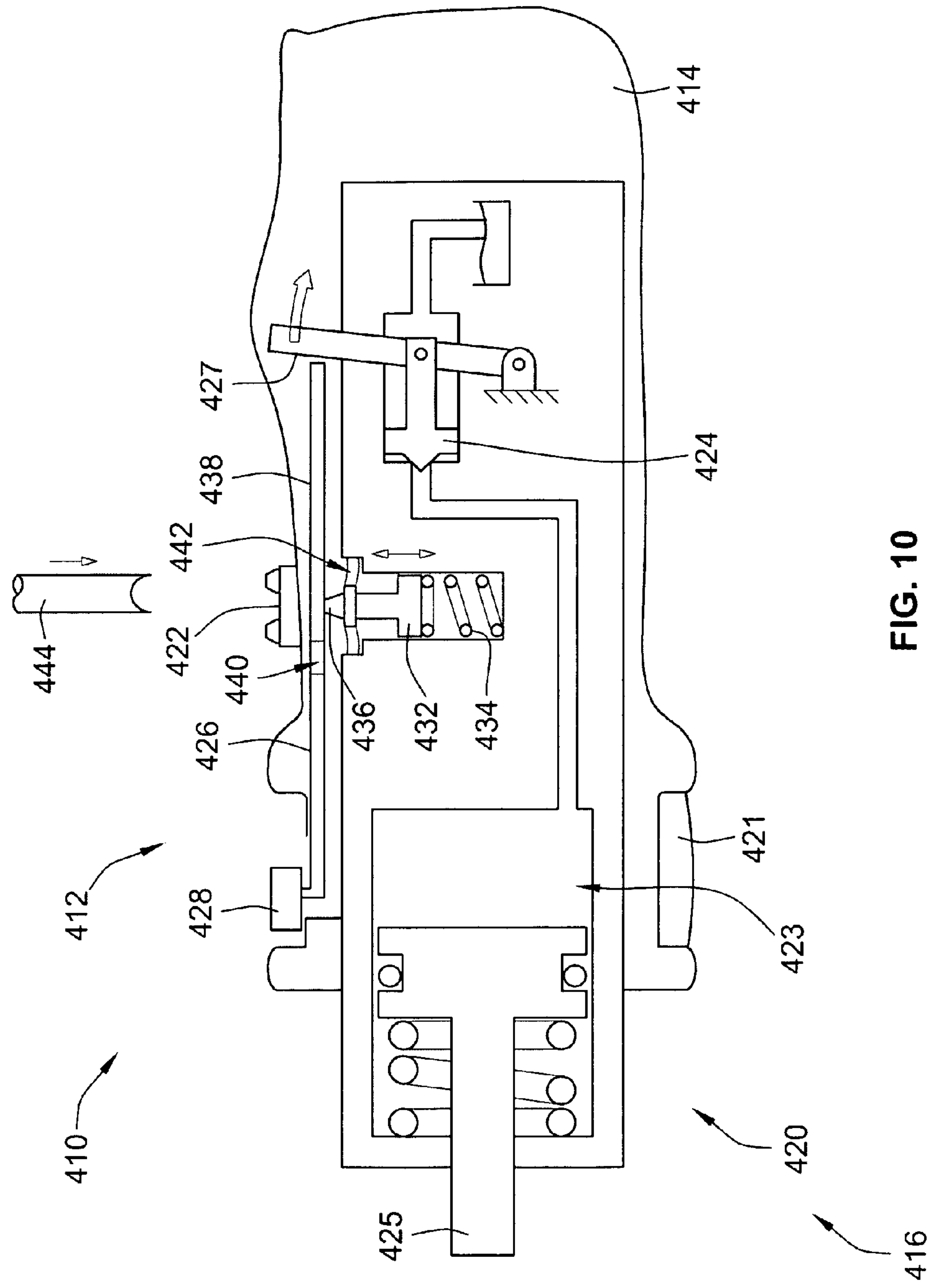
FIG. 10 is a perspective view of another alternative disabling device for a pressing tool.

FIG. 10 is a perspective view of a further alternative disabling device 412 for a pressing tool 410. The pressing tool 410 includes a tool body 414 having a working end 416. Tooling (not shown) is provided at the working end 416. The tooling is configured to be driven by an actuator 420 during a pressing operation. The actuator 420 is held by the tool body 414 and is operated by an activation switch or trigger 421.

In an exemplary embodiment, a cover 422 is coupled to the tool body 414. The cover 422 may be similar to the cover 122 (shown FIG. 4). The cover 422 may provide a visual indication of activation of the disabling device 412. Optionally, the cover 422 may have anti-tamper feature securing the cover 422 to the tool body 414.

The disabling device 412 is held by the tool body 414. The disabling device 412 is operable to release hydraulic pressure of the actuator 420 during the pressing operation. In an exemplary embodiment, the actuator 420 includes a cylinder 423 that receives hydraulic fluid from a pump and a piston 425 held within the cylinder 423. As the cylinder 423 fills with hydraulic fluid, the piston 425 is pushed outward to drive the tooling. The disabling device 412 may be activated to operate a fluid dump 424 associated with the actuator 420. When the disabling device 412 is operated, the hydraulic fluid is released or drained from the cylinder 423 to stop the pressing operation and/or to retract the piston 425 to an initial position. The disabling device 412 prevents operation of the actuator 420 until a secondary operation is performed. In an exemplary embodiment, the fluid dump is represented by a dump valve that seals off a drain. The fluid dump 424 is connected to a lever 427. When the lever 427 is actuated, the lever 427 forces the dump valve 424 to an open position. FIG. 10 illustrates the dump valve 427, and thus the disabling device 412 in a normal operation position in FIG. 10, allowing the piston to be actuated normally.

The disabling device 412 includes a slide 426 that is actuated to operate the lever 427, and thus the fluid dump 424. The disabling device 412 also includes a trigger 428 operatively coupled to the slide 426 that moves the slide 426 when the trigger 428 is operated. In the illustrated embodiment, the trigger 428 is represented by a button that is slid along the tool body 414 toward and away from the working end 416 to an actuated position. In an exemplary embodiment, the trigger 428 is slid away from the working end 416 to activate the disabling device 412 and release the pressure. The slide 426 is represented by a plate having a lever end that is engaged to the lever 427 of the fluid dump 424. The disabling device 412 is operated by sliding the trigger 428, which slides the slide 426 backward to activate the fluid dump 424 and thus release the pressure of the actuator 420. In an alternative embodiment, the slide 426 slides inward into the tool body 414 rather than parallel to the outer surface of the tool body 414. The slide 426 may force the lever 427 inward rather than rearward as in the illustrated embodiment.

The disabling device 412 includes a spring-loaded pin 432 that is forced generally outward by a bias spring 434 toward the slide 426. A tip 436 of the pin 432 slides along an inner surface 438 of the slide 426 as the trigger 428 is slid to the activated position from a normal operation position (not shown). The slide 426 includes an opening 440 therethrough. When the opening 440 is aligned with the pin 432, the pin 432 is forced outward into the opening 440. The pin 432 blocks the slide 426 from returning to the normal operation position. For example, when the pin 432 is received in the opening 440, the trigger 428 cannot be moved forwardly to the normal operation position because the pin 432 stops forward movement of the slide 426.

The pin 432 is aligned with an opening 442 in the tool body 414. The cover 422 covers the opening 442. The cover 422 must be removed to provide access to the opening 442. In an exemplary embodiment, the cover 422 is removed from the tool body 414 in a similar manner as the cover 122 (shown in FIG. 4). The pin 432 may be reset to a normal operation position by inserting a key 444 or other resetting tool through the opening 442 and pushing the pin 432 inward. The trigger 428 and slide 426 may then be reset to the normal operation position. Optionally, as the slide 426 is moved to the normal or initial position, the slide 426 may pull the lever 427 forwardly. Alternatively, the lever 427 may be spring biased to return to the initial position when the slide 426 is returned to the normal position. In the normal operation position, the inner surface 438 of the slide 426 is aligned with the pin 432 and keeps the pin 432 in the normal operation position. The actuator 420 may be operated normally when the fluid dump 424 is in the normal operation position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A pressing tool comprising:

an actuator; and a disabling device operable to stop the actuator during a pressing operation, the disabling device having a removable trigger being entirely removed from the disabling device to operate the disabling device, wherein the actuator is disabled and locked in a disabled position after the disabling device is operated.

2. The tool of claim 1, wherein the disabling device is configured to be reset to a normal operation position by a key.

3. The tool of claim 1, further comprising tooling that is configured to be driven by the actuator during the pressing operation.

4. The tool of claim 1, wherein the disabling device includes a housing and a ram received within the housing, the trigger engaging the ram, the trigger being removed to actuate the ram to a disabled position in which the ram engages a fluid dump to release the pressure of the actuator, the ram being locked in the disabled position such that the trigger is blocked from returning to a normal operation position by the ram.

5. The tool of claim 1, wherein the disabling device includes a housing and a ram received within the housing, the trigger engaging the ram, the trigger being operated to actuate the ram to a disabled position in which the ram engages a fluid dump to release pressure of the actuator, the ram being locked in the disabled position such that the trigger is blocked from returning to a normal operation position by the ram, the housing includes a key way configured to receive a key therethrough for engaging the ram and for returning the ram to a normal operation position, the trigger being reset after the ram is returned to the normal operation position.

6. The tool of claim 1, wherein the disabling device includes a housing and a ram received within the housing, the trigger engaging the ram, the trigger being operated to actuate the ram to a disabled position in which the ram engages a fluid dump to release pressure of the actuator, the ram being locked in the disabled position such that the trigger is blocked from returning to a normal operation position by the ram, the housing includes an end having a key way therethrough, the ram being forced in a release direction generally away from the end by a bias spring, the ram having a key slot generally aligned with the key way, wherein the key way is configured to receive a key therethrough in a direction along the release direction, the key slot being configured to matably receive the key to return the ram to the normal position.

7. The tool of claim 1, wherein the trigger constitutes a pull pin operated by pulling the pull pin from the disabling device.

8. The tool of claim 1, wherein the disabling device includes a housing and a ram received within the housing, the trigger engaging the ram, the trigger being operated to actuate the ram to a disabled position in which the ram engages a fluid dump to release pressure of the actuator, the ram being locked in the disabled position such that the trigger is blocked from returning to a normal operation position by the ram, the trigger extending through a trigger bore in the housing and a trigger bore in the ram when the trigger is in the normal position, the trigger bore in the ram being misaligned with the trigger bore in the housing after the trigger is operated to actuate the ram.

9. The tool of claim 8, wherein a wall of the ram is aligned with the trigger bore in the housing when the ram is in the disabled position such that the trigger cannot be loaded into the trigger bore in the ram.

10. A hydraulic pressing tool comprising:

a tool body having a working end;

a hydraulic actuator held by the tool body and operated during a pressing operation, the hydraulic actuator having a fluid dump; and a disabling device operable to release the pressure of the hydraulic actuator during the pressing operation, the disabling device having a housing coupled to the tool body and a ram received within the housing, the disabling device having a trigger engaging the ram, the trigger being operated to actuate the ram to a disabled position in which the ram engages the fluid dump to release the pressure of the hydraulic actuator, the ram being locked in the disabled position such that the trigger is blocked from returning to a normal operation position by the ram.

11. The tool of claim 10, wherein the trigger is entirely removed from the housing, wherein the ram is actuated to the disabled position when the trigger is removed from the housing.

12. The tool of claim 10, wherein the housing includes a key way configured to receive a key therethrough for engaging the ram and for returning the ram to a normal operation position, the trigger being reset after the ram is returned to the normal operation position.

13. The tool of claim 10, wherein the housing includes an end having a key way therethrough, the ram being forced in a release direction generally away from the end by a bias spring, the ram having a key slot generally aligned with the key way, wherein the key way is configured to receive a key therethrough in a direction along the release direction, the key slot being configured to matably receive the key to return the ram to the normal position.

14. The tool of claim 10, wherein the trigger constitutes a pull pin operated by pulling the pull pin from the housing, the trigger extending through a trigger bore in the housing and a trigger bore in the ram when the trigger is in the normal position, the trigger bore in the ram being misaligned with the trigger bore in the housing after the trigger is operated to actuate the ram.

15. The tool of claim 14, wherein a wall of the ram is aligned with the trigger bore in the housing when the ram is in the disabled position such that the trigger cannot be loaded into the trigger bore in the ram.

16. The tool of claim 10, further comprising a bias spring positioned between the ram and the housing, the bias spring biases against the ram to force the ram in the release direction to the disabled position.

* * * * *